US010494230B2

(12) United States Patent
Fragner

(10) Patent No.: US 10,494,230 B2
(45) Date of Patent: Dec. 3, 2019

(54) PASSENGER CONVEYOR PERFORMANCE RATING SYSTEM

(71) Applicant: Otis Elevator Company, Farmington, CT (US)

(72) Inventor: Romain Fragner, Sandillon (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/995,460

(22) Filed: Jun. 1, 2018

(65) Prior Publication Data

US 2018/0346287 A1   Dec. 6, 2018

(30) Foreign Application Priority Data

Jun. 2, 2017   (EP) .................................... 17305650

(51) Int. Cl.
*B66B 25/00* (2006.01)
*B66B 21/00* (2006.01)
(Continued)

(52) U.S. Cl.
CPC .......... *B66B 25/006* (2013.01); *B66B 1/3415* (2013.01); *B66B 5/0025* (2013.01); *G06F 3/0484* (2013.01)

(58) Field of Classification Search
None
See application file for complete search history.

(56) References Cited

U.S. PATENT DOCUMENTS 5,616,894 A * 4/1997 Nieminen ................. B66B 1/34
187/247
D665,403 S   8/2012 Doll
(Continued)

FOREIGN PATENT DOCUMENTS

CN   101525100 A   9/2009
CN   104724557 A   6/2015
(Continued)

OTHER PUBLICATIONS

Extended European Search Report for European Application No. 17305650.8, European Filing Date Jun. 2, 2017, dated Dec. 11, 2017, 8 pages.
(Continued)

*Primary Examiner* — Kavel Singh
(74) *Attorney, Agent, or Firm* — Cantor Colburn LLP

(57) ABSTRACT

A passenger conveyor performance rating system includes a user device and a computing server. The user device obtains geographical information of the passenger conveyor system and displays a graphical user interface. The graphical user interface receives a first input indicating an operating performance of an individual passenger conveyor and a second input indicating at least one operation fault of the individual passenger conveyor. The computing server receives first data indicating the operating performance, second data indicating the at least one operation fault, and third data indicating the geographical information. The computing server further determines a faulty passenger conveyor system based on the first data and the second data and determines the geographical location of the faulty passenger conveyor system based on the geographical information received from the user device.

13 Claims, 7 Drawing Sheets

(51) Int. Cl.
   *B66B 5/00*   (2006.01)
   *B66B 1/34*   (2006.01)
   *G06F 3/0484*   (2013.01)

(56) References Cited

U.S. PATENT DOCUMENTS

| | | |
|---|---|---|
| 8,332,232 B2 | 12/2012 | Nickerson et al. |
| 9,098,311 B2 | 8/2015 | Lorch |
| D748,117 S | 1/2016 | Kadosh |
| D759,032 S | 6/2016 | Amin et al. |
| 2012/0208165 A1 | 8/2012 | Levaniemi et al. |
| 2012/0284203 A1 | 11/2012 | Kivirauma et al. |
| 2012/0317064 A1 | 12/2012 | Hagiwara et al. |
| 2013/0191197 A1 | 7/2013 | Hamrick et al. |
| 2014/0222512 A1 | 8/2014 | Pace |
| 2015/0186959 A1 | 7/2015 | Koljonen et al. |
| 2016/0130114 A1 | 5/2016 | Wilke |
| 2017/0146349 A1* | 5/2017 | Yang .................. G01C 21/005 |

FOREIGN PATENT DOCUMENTS

| | | |
|---|---|---|
| CN | 303439289 S | 11/2015 |
| JP | 2003067877 A | 3/2003 |
| JP | 2003187089 A | 7/2003 |
| JP | 2009190874 A | 8/2009 |

OTHER PUBLICATIONS

Happy or Not; "Our Smileys for your business", https://www.happy-or-not.com/en/measure/; 11 pages.

\* cited by examiner

PASSENGER CONVEYOR PERFORMANCE RATING SYSTEM

CROSS-REFERENCE TO RELATED APPLICATIONS

This application claims the benefit of European Application No. 17305650.8, filed Jun. 2, 2017, which is incorporated herein by reference in its entirety.

BACKGROUND

The present disclosure relates generally to passenger conveyor systems, and more particularly, to passenger conveyor maintenance and operational diagnostics.

Passenger conveyor systems such as elevator systems, escalator systems, etc., often require inspection and/or maintenance to ensure passengers are provided continuous and uninterrupted service. A technician may be required to visit buildings installed with passenger conveyor systems and perform routine inspections of the passenger conveyors (e.g., elevator cars, escalator stairs, etc.) to ensure they are in working order. However, a technician can be required to put forth extensive time and effort in order to visit every passenger conveyor system that is maintained by a maintenance service organization. In addition, passengers are the first to realize an operating fault, but may be unaware how to inform a building manager and/or technician of the operating fault. Consequently, there may be an excessive delay from the time at which the operating fault occurs until the time at which the operating fault is ultimately resolved.

BRIEF DESCRIPTION

According to a non-limiting embodiment, a passenger conveyor performance rating system is provided that includes a user device and a computing server. The user device obtains geographical information of the passenger conveyor system and displays a graphical user interface. The graphical user interface receives a first input indicating an operating performance of an individual passenger conveyor and a second input indicating at least one operation fault of the individual passenger conveyor. The computing server receives first data indicating the operating performance, second data indicating the at least one operation fault, and third data indicating the geographical information. The computing server further determines a faulty passenger conveyor system based on the first data and the second data and determines the geographical location of the faulty passenger conveyor system based on the geographical information received from the user device.

In addition to one or more of the features described herein, or as an alternative, further embodiments of the passenger conveyor performance rating system provides a feature wherein the user device obtains identification (ID) information of the individual passenger conveyor among a plurality of passenger conveyors included in the passenger conveyor system.

In addition to one or more of the features described herein, or as an alternative, further embodiments of the a passenger conveyor performance rating system provides a feature wherein the computing server identifies the individual passenger conveyor containing the fault among a plurality of passenger conveyors included in the passenger conveyor system based on the ID information.

In addition to one or more of the features described herein, or as an alternative, further embodiments of the passenger conveyor performance rating system provides a feature wherein the computing server generates a graphical map displaying the geographical location of the faulty passenger conveyor system based on the geographical information received from the user device.

In addition to one or more of the features described herein, or as an alternative, further embodiments of the passenger conveyor performance rating system provides a feature wherein the computing server updates a maintenance schedule based on the first and second data.

In addition to one or more of the features described herein, or as an alternative, further embodiments of the passenger conveyor performance rating system provides a feature wherein the computing server automatically sends a maintenance inquiry based on the contact information, the maintenance inquiry proposing maintenance service of the identified passenger conveyor.

In addition to one or more of the features described herein, or as an alternative, further embodiments of the passenger conveyor performance rating system provides a feature wherein the user device automatically displays the graphical user interface in response to detecting the at least one operation fault of the individual passenger conveyor.

In addition to one or more of the features described herein, or as an alternative, further embodiments of the passenger conveyor performance rating system provides a feature wherein the user device is a first mobile terminal device, and wherein the computing server is in signal communication with a second mobile terminal device different from the first mobile terminal device, and the computing server transmits an updated maintenance schedule and the graphical map to the second mobile terminal device.

Also disclosed is a method of diagnosing an operating performance of a passenger conveyor system. The method comprises obtaining, via a user device, geographical information of the passenger conveyor system, and displaying, via the user device, a graphical user interface. The graphical user interface is configured to receive a first input indicating an operating performance of an individual passenger conveyor included in the passenger conveyor system, and a second input indicating at least one operation fault of the individual passenger conveyor. The method further includes receiving, at a computing server, first data, second data, and third data transmitted by the user device. The first data indicates the operating performance, the second data indicates the at least one operation fault, and the third data indicates the geographical information. The method further includes determining a faulty passenger conveyor system based on the first data and the second data, and determining the geographical location of the faulty passenger conveyor system based on the geographical information received from the user device.

In addition to one or more of the features described herein, or as an alternative, further embodiments of method provides a feature of obtaining, via the user device, identification (ID) information of the individual passenger conveyor among a plurality of passenger conveyors included in the passenger conveyor system.

In addition to one or more of the features described herein, or as an alternative, further embodiments of the method provides a feature of identifying, via the computing server, the individual passenger conveyor containing the fault among a plurality of passenger conveyors included in the passenger conveyor system based on the ID information received from the user device.

In addition to one or more of the features described herein, or as an alternative, further embodiments of the method provides a feature wherein the computing server generates a graphical map displaying the geographical location of the faulty passenger conveyor system based on the geographical information received from the user device.

In addition to one or more of the features described herein, or as an alternative, further embodiments of the method provides a feature wherein the computing server determines contact information corresponding to the passenger conveyor system based on the geographical information.

In addition to one or more of the features described herein, or as an alternative, further embodiments of the method provides a feature wherein the computing server automatically sends a maintenance inquiry based on the contact information, the maintenance inquiry proposing maintenance service of the identified passenger conveyor.

In addition to one or more of the features described herein, or as an alternative, further embodiments of the method provides a feature wherein the user device automatically displays the graphical user interface in response to detecting the at least one operation fault of the individual passenger conveyor.

In addition to one or more of the features described herein, or as an alternative, further embodiments of the method provides a feature wherein the user device is a first mobile terminal device, and the computing server is in signal communication with a second mobile terminal device different from the first mobile terminal device, and the computing server transmits an updated maintenance schedule and the graphical map to the second mobile terminal device, and wherein the computing server updates the maintenance schedule based on the first and second data.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
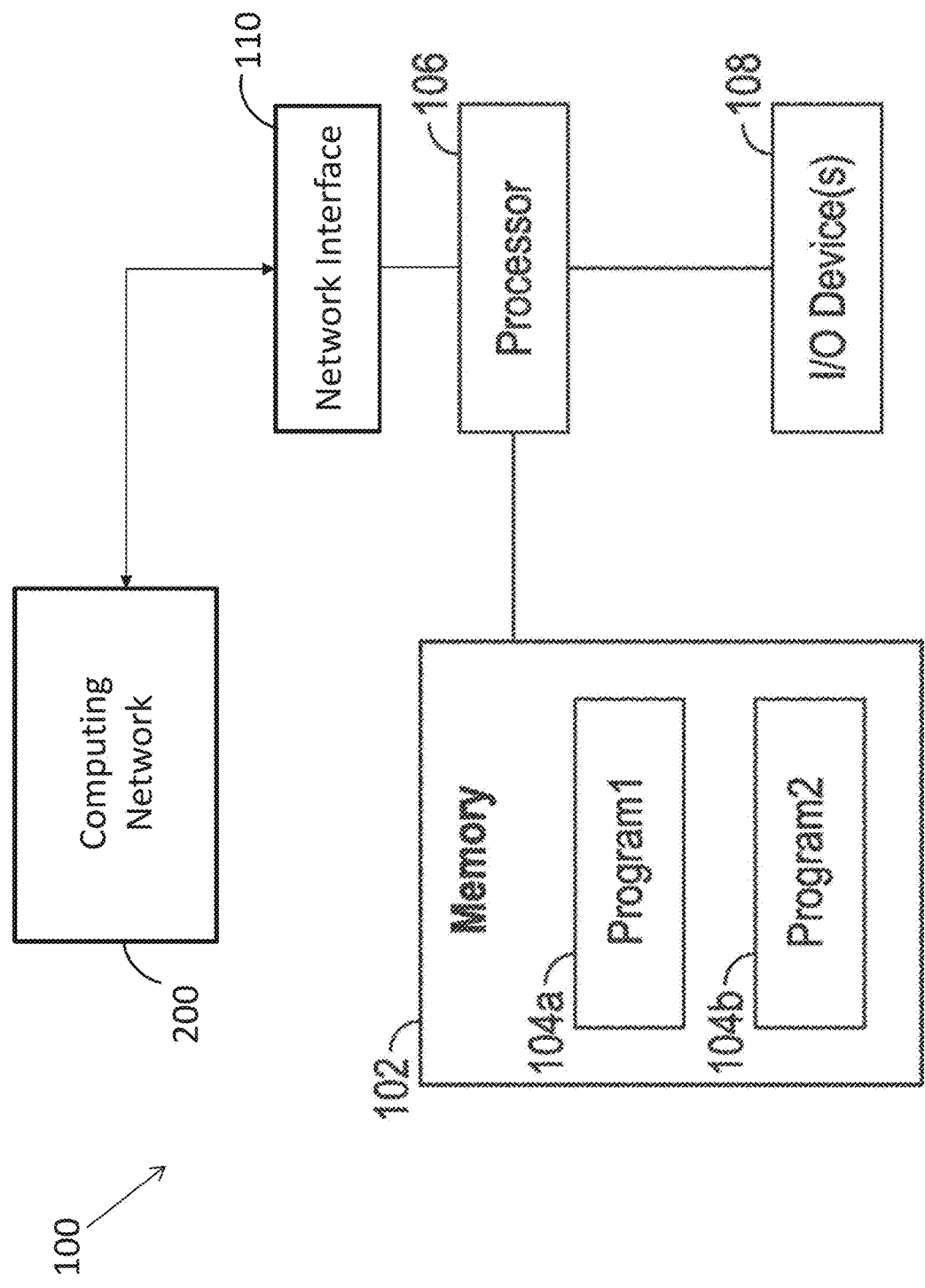
FIG. 1 is a block diagram of a computing system according to a non-limiting embodiment.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Turning now to an overview of technologies that are more specifically relevant to aspects of the present teachings, one solution to resolve the problems of reducing the time and excessive workloads of technicians described above is to encourage passengers within the elevator to inform the technician or service maintenance organization of a needed repair, replacement, inspection, etc. In this manner, maintenance can be performed in a timely manner from when the issue or operating fault is first observed. Current solutions include posting a phone number (or website) in or near the elevator with the intention that the passenger will notice the phone number and call the technician. However, passengers may be hesitant to actively contact the technician, or may not notice the contact information before the ride or service is completed (e.g., elevator reaches the desired floor or the escalator reaches the desired platform). Accordingly, an improved means for reporting an operating performance of a passenger conveyor system is desirable.

Turning now to an overview of the aspects of one or more embodiments of the inventive teachings, the above-described shortcomings of the prior art are addressed by providing a passenger conveyor performance rating system that includes a maintenance computing server which exchanges data with a user device to determine an operational performance of a passenger conveyor included in a passenger conveyor system.

In one or more non-limiting embodiments, the user device is a passenger's mobile terminal device. The passenger's mobile terminal device can be installed with a software application (i.e., App) capable of obtaining identification (ID) information of the passenger conveyor (e.g., elevator, escalator, etc.) included in the passenger conveyor system, and obtaining geographical information of the passenger conveyor system (e.g., street address of the building hosting the passenger conveyor system). The App can display a graphical user interface (GUI) on the mobile terminal device. The GUI can receive a first input from the passenger indicating an operating performance of a given passenger conveyor (e.g., the elevator car containing the passenger), and a second input indicating at least one operation fault (e.g., noises, vibration, stoppage) of the identified passenger conveyor.

A computing server (e.g., maintenance server) can receive the data provided by the mobile terminal device and generate a graphical map displaying the geographical location of the passenger conveyor system experiencing an operation fault based on the geographical information. In this manner, a technician can conveniently be informed of a maintenance issue that requires further investigation and can be quickly routed to the location of the passenger conveyor system. The mobile terminal device can also provide the computing server with contact information (e.g., telephone number of building that contains faulty elevator system, email address of building manager, mailing address of building, etc.) associated with the passenger conveyor system experiencing the operating fault. Accordingly, the computing server can automatically send a maintenance inquiry (e.g., an email to the manager of the building containing the faulty elevator system, a telephone call to the building manager, a text message to the building manager, etc.) proposing maintenance service of an identified faulty passenger conveyor include in a given passenger conveyor system.

With reference now to FIG. 1, a computing system 100 capable of performing one or more embodiments of the invention is illustrated. The computing system 100 includes a memory 102 and an electronic hardware processor 106. The memory 102 stores various instructions algorithms which are executable by the processor 106. The executable instructions can be stored or organized in any manner and at any level of abstraction, such as in connection with one or more processes, routines, procedures, methods, functions, etc. As an example, at least a portion of the instructions are shown in FIG. 1 as being associated with a first program 104a and a second program 104b.

The processor 106 can be included in a computing system operated by a maintenance service company, for example, or can be installed in a mobile computing device. The processor 106 electrically communicates with the memory 102 via one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 108 may be configured to provide an interface to allow a user to interact with the system 100.

The computing system 100 further includes a network interface 110 capable of electrical communication with a computing network 200. The computing network 200 can be implemented as a local on-site network and/or a cloud computing network. The network interface 110 includes any communication device (e.g., a modem, wireless network adapter, etc.) that operates according to a network protocol (e.g., Wi-Fi, Ethernet, satellite, cable communications, etc.) which establishes a wired and/or wireless communication with the computing network 200.

The computing system 100 is illustrative as an example. In some embodiments, one or more of the entities may be optional. In some embodiments, additional entities not shown may be included. For example, in some embodiments the computing system 100 may be associated with one or more networks, such as one or more computer or telephone networks. In some embodiments, the entities may be arranged or organized in a manner different from what is shown in FIG. 1.

Figure 2:
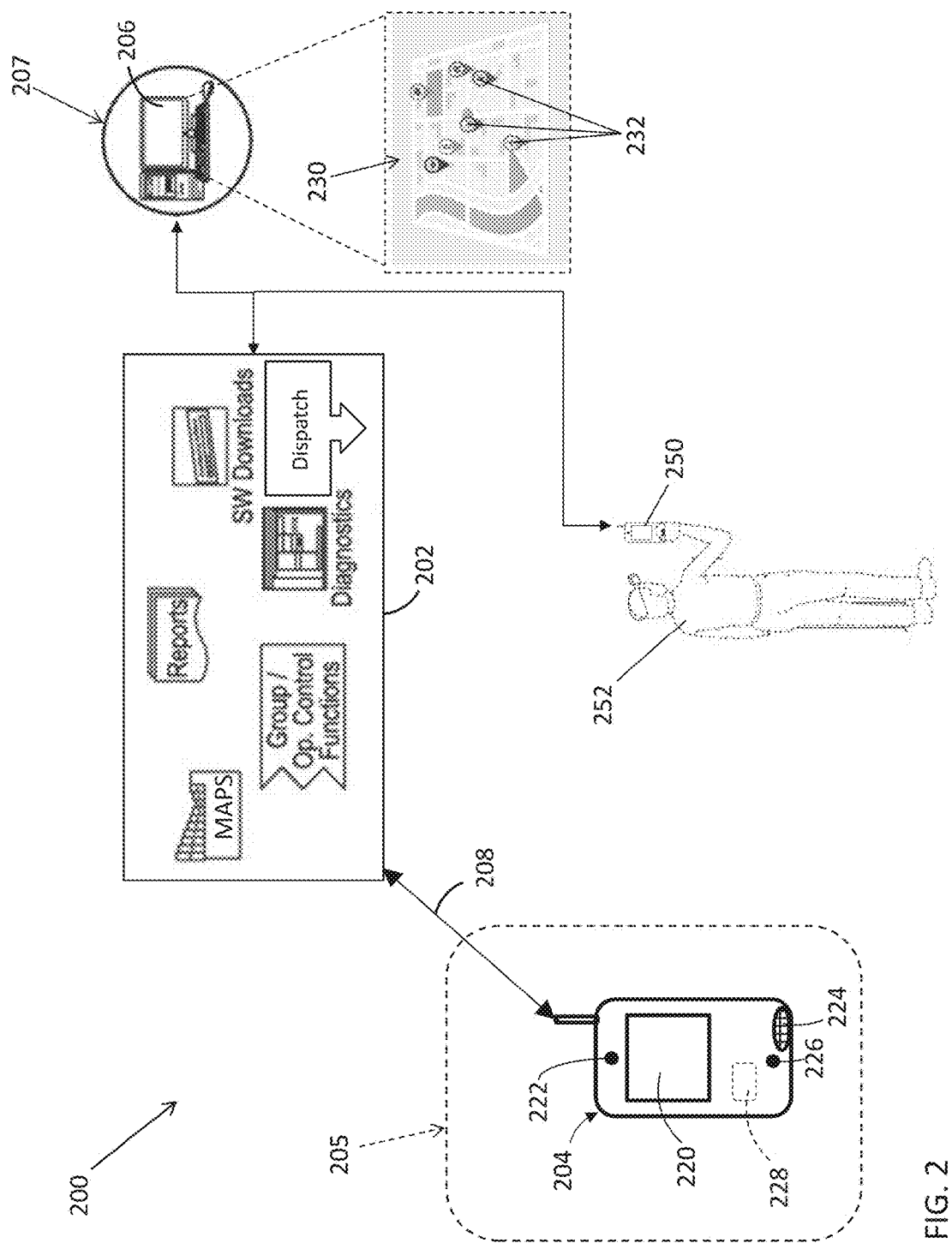
FIG. 2 illustrates a computer network capable of operating a passenger conveyor performance rating system according to a non-limiting embodiment.

Turning now to FIG. 2, a computing network 200 capable of performing one or more embodiments of the invention is illustrated according to a non-limiting embodiment. The computing network 200 includes a computing server 202, one or more mobile terminal devices 204, and one or more backend computers 206.

The computing server 202 is a computing device capable of providing functionality for other programs or devices, typically referred to as "clients". The computing server 202 can be implemented as a local on-site server, a remotely located service-operated server, or a cloud computing server. The computing server 202 can store setup parameters for select functions. In some embodiments, the setup parameters can be stored in a controller. In some embodiments, there may be a simplified failover functionality located in the controller in the event that there is a connection loss between the controller and the computing server 202.

In some embodiments, operational metrics may be collected at the computing server 202 across a portfolio of multiple units, sites, or groups. The metrics may be analyzed by, e.g., the backend computer 206, to provide a broad view of the portfolio. For example, the analysis may indicate trends and may be used to respond to needs (e.g., product needs or functionality needs). The analysis may also be used to facilitate diagnostic or troubleshooting capabilities. Metrics may be used to trigger or enhance the accuracy of sales proposals. Diagnostics and/or detect faults may be used to provide or schedule maintenance activities, such as preventive maintenance activities. In some embodiments, interface protocols configured to operate with new devices, for example, may be stored in the computing server 202 and used by a local controller.

In some embodiments, functional upgrades for diagnostics, prognostics, and remote repair/rescue functions can be deployed to customers as they are released and deployed into the computing server 202. Functionality may be developed at the backend computer 206 (installed at a server location 207 remotely located from the mobile terminal device 204) and deployed to the computing server 202. One or more tests may be executed to ensure that the functionality satisfies operational or safety requirements.

In some embodiments, a modernization of cloud supported controllers (not shown) may be provided. The controllers can utilize a computing server 202 to enable new features or support new devices/equipment. Before or during the modernization, the controllers may receive updates via the computing server 202 to support interface protocols to new equipment and/or add new functions/capabilities. For example, if a new fixture is added requiring a new interface, a controller may enable the new functionality from the computing server 202 once the new fixture has been integrated into the computing network 200 without requiring an upgrade of software on the controller. As yet another example, a new dispatching algorithm may be implemented from the cloud to optimize traffic during the modernization phase of the project.

The mobile terminal device 204 is capable of communicating with the computing server 202 over one or more connections, channels, or links facilitated by a network interface. The mobile terminal device 204 includes a smartphone 204, for example, which can be located in or near a passenger conveyor location 205, and is capable of electrically communicating with the computing server 202 via a connection 208. The connection 208 can adhere to one or more communication protocols, standards, or the like. For example, the connection 208 can adhere to telephone, cellular, Wi-Fi, Ethernet, satellite, or cable communications. In some embodiments, the connection 208 may be constant or persistent. Although the mobile terminal device 204 will be referred to as a smartphone 204 hereinafter, the mobile terminal device 204 can include any mobile device capable of facilitating interaction between one or more stored software applications (i.e., apps) and the computing server 202. For example, the mobile terminal device 204 can also include a computer tablet, a laptop computer, a smart watch, etc.

The smartphone 204 includes a display 220, and other components capable of detecting data, information, or objects such as, for example, sound, vibrations, images, etc.

The smartphone 204 stores in memory a passenger conveyor performance rating software application (referred to herein as a performance rating app). The performance rating app can be manually invoked by the passenger or can be automatically invoked when the smartphone 204 detects one or more operating conditions of a passenger conveyor that is servicing the passenger. For example, a passenger riding a particular elevator car may experience abnormal noises and or vibrations. The passenger's smartphone 204 can detect the noises via a microphone and/or the vibrations via an accelerometer. In response to detecting the noises and/or vibrations, the smartphone 204 can automatically launch the performance rating app.

The performance rating app obtains inputs from the passenger which rates the operating performance of a passenger conveyor system and/or a specific passenger conveyor included in the passenger conveyor system. The performance rating app and the smartphone 204 itself can also determine geographical information of a particular passenger conveyor system and/or identification (ID) information of a passenger conveyor (e.g., elevator, escalator, etc.) included in a given passenger conveyor system. For instance, the performance rating app can prompt a passenger to input geographical information such as, for example, a street address, building name, global positioning system (GPS) coordinates, or store name. The geographical information is then exchanged with the computing server 202 via connection 208.

As described above, functionality may be (re)located to a computing server 202 (e.g., maintenance server 202). In terms of passenger conveyor systems, for example, such functionality may include dispatch functions for one or more passenger conveyor devices, mobile terminals, operational mode determinations, diagnostic functions, special contract features, etc. Regarding dispatch functions, in some embodiments a passenger request for service received at, e.g. a hall box located on a particular floor of a building, may be communicated to the computing server 202. In response to the request, the computing server 202 may transmit a command that directs a specified elevator car to relocate to that particular floor to fulfill the service request.

In some embodiments, a local controller (not shown) can maintain some functionality, and as such, may include hardware and computing resources to support such functionality. The controller can include hardware and/or software to communicate with the computing server 202. For example, the controller can exchange data and commands with the computing server 202 to perform control functions. Accordingly, additional dispatch functions may include initiating phone calls, text messages, emails, or other types of communication.

The computing server 202 can also store a map Application Programming Interface (API) and/or map graphics engine to perform various geographical calculations and map generation operations based on geographical information provided by the smartphone 204. For example, the smartphone 204 may obtain GPS information, and building identification (ID) information. The GPS information is obtained from traditional GPS systems as understood by one of ordinary skill in the art. The building ID information can be obtained from a building's local wireless system and/or from a passenger conveyor system configured to wirelessly broadcast its own ID information. The building ID information may also be obtained by using a camera installed on the smartphone 204 to scan barcodes or Quick Response (QR) codes. Based on the building ID information, the computing server 202 can generate a geographical map 230 with indicators 232 that identify the location of one or more passenger conveyor systems. The map 230 can then be displayed on a screen of the backend computer 206.

The computing server 202 may also be in signal communication with a mobile terminal device 250 possessed by a maintenance technician 252. The performance ratings received from a passenger's smartphone 204 can be used by the computing server 202 to diagnose a particular passenger conveyor system and/or individual passenger conveyor included in the passenger conveyor system. When an operation fault is diagnosed, the computing server 202 can execute a dispatch function that actively updates a technician's maintenance schedule in real-time and provides the technician with a map indicating the location of the passenger conveyor system experiencing the operating fault. In this manner, the technician can quickly and conveniently visit the building containing the faulty passenger conveyor system.

The geographical information received from the smartphone 204 can also be used to obtain additional contact information (e.g., telephone number, email address, etc.) of the building containing the faulty passenger conveyor system. For example, scan codes can be located on a respective passenger conveyor (e.g., in an elevator car) and can identify the building address, the name of the building or store, the contact information of building manager, a serial number of the passenger conveyor system, the manufacturer of the passenger conveyor system and/or a particular passenger conveyor (e.g., an individual elevator car or escalator) among a plurality of passenger conveyors included in a passenger conveyor system. Based on the contact information, the server can execute a dispatch function which includes automatically sending a maintenance inquiry based on the contact information. The maintenance inquiry includes, for example, a proposed maintenance service of an identified faulty passenger conveyor. For instance, in response to determining a passenger's operating performance rating indicates a faulty elevator car, the computing server 202 can automatically send a service inquiry (e.g., an email, text message, telephone call, etc.) to the service manager of the building containing a faulty elevator car identified from a passenger's smartphone 204. The service inquiry can automatically be generated to include language offering to dispatch a technician to diagnose and service the identified faulty elevator car.

Figure 3:
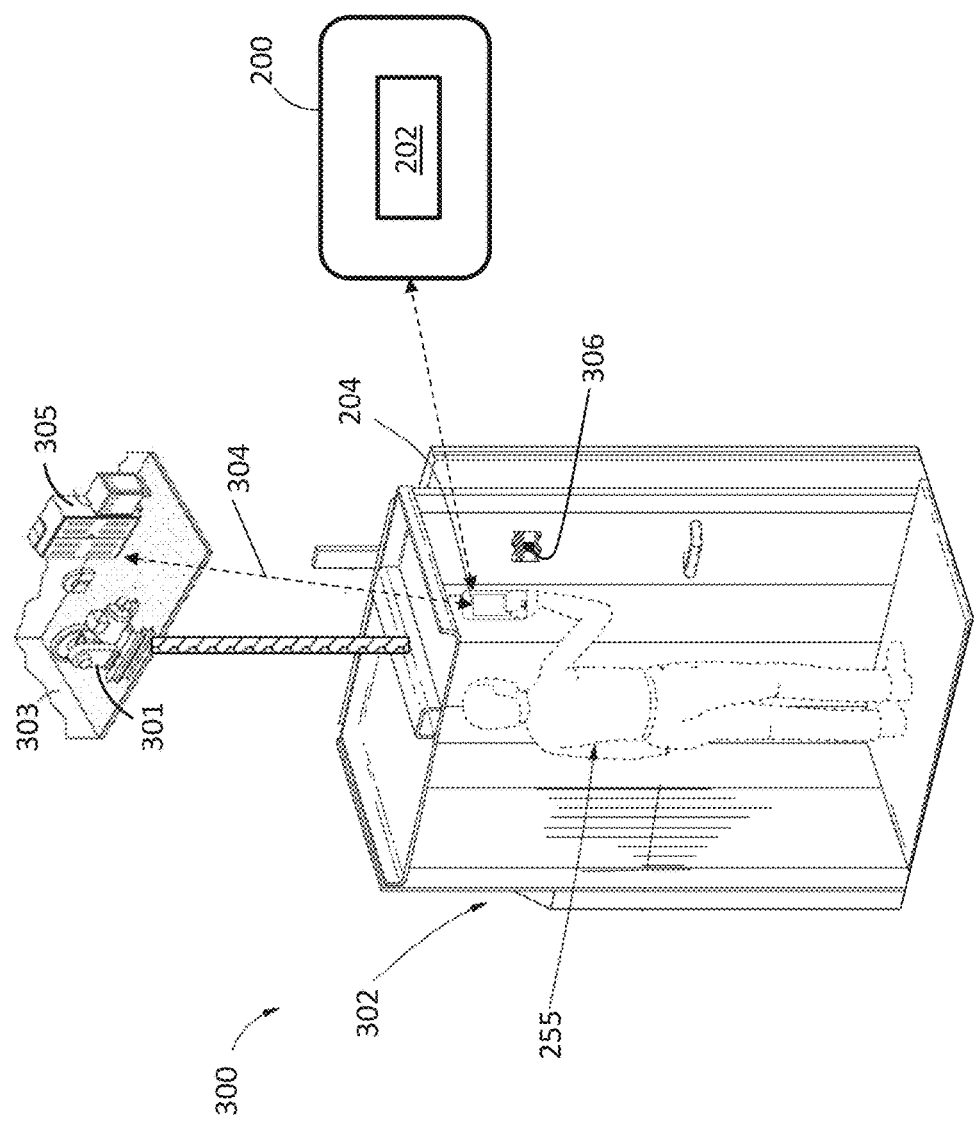
FIG. 3 illustrates a mobile terminal device installed with a passenger conveyor performance rating software application and operating in the vicinity of an elevator system according to a non-limiting embodiment.

Turning now to FIG. 3, a passenger 255 is shown possessing a smartphone 204 installed with a passenger conveyor performance rating app operating in the vicinity of an elevator system 300. Although an elevator system 300 is described with reference to FIG. 3, it should be appreciated that the smartphone 204 can operate in conjunction with other types of passenger conveyor systems including, but not limited to, a vertical escalator system, a horizontal escalator system (i.e., an automated moving walkway system), etc., without departing from the scope of the invention.

The elevator system 300 includes a machine 301 which is installed in a machine room 303. The machine 301 drives an elevator car 302 positioned in a vertical hoistway (not shown). The mechanical operations for driving the elevator car 302 to one or more floors requested by the passenger 255 are well-known and therefore will not be described in further detail.

The machine room 303 also contains an elevator computer server 305. The elevator server 305 includes various computing devices including, but not limited to, an electronic hardware controller, memory, and a data communications system. The data communication system includes, for example, a network interface device. As described herein, the network interface device includes any communication device (e.g., a modem, wireless network adapter, etc.) that operates according to a network protocol (e.g., Wi-Fi, Ethernet, satellite, cable communications, etc.) which establishes a wired and/or wireless communication with another electrical device. Accordingly, the elevator server 305 can establish a wireless communication session 304 with the smartphone 204 to exchange various ID information including, but not limited to, a serial number of the elevator system 300, the manufacturer of the elevator system 300, an ID of the elevator car 302 among a plurality of individual elevator cars included in the elevator system 300, and building information corresponding to the building or structure containing the elevator system 300.

The ID information described above may also be obtained by processing a scan code 306 (e.g., a bar code or QR code) located in the elevator car 302. For instance, the smartphone camera can capture an image of the scan code 306, which can then be further processed by the smartphone 204 and/or exchanged with the computing server 202, via the computing network 200, for further processing to obtain the ID information described above.

A passenger 255 can rate the operating performance of the elevator system 300 and/or the particular elevator car 302 performing the ride service using a performance rating app installed on the smartphone 204. The performance rating app may also allow the passenger 255 to input operating fault information which may have been experienced by the passenger 255 during the ride service. The fault information can include, but is not limited to, noises, vibrations, or service stoppages. The rating input, along with the ID information and fault information can be transmitted to the computing server 202, via the computing network. Based on the operating performance rating input by the passenger 255, the computing server 202 can determine whether the elevator system 300 and/or elevator car 302 is faulty, and if so, can perform various dispatch operations as described herein. In addition to recording faulty operation incidents, the computing server 202 can also record satisfactory or successful rating inputs by the passenger 255. Accordingly, health reports of the elevator system 300 can be conveniently generated, thereby facilitating the scheduling of routine inspections by a technician.

Figure 4:
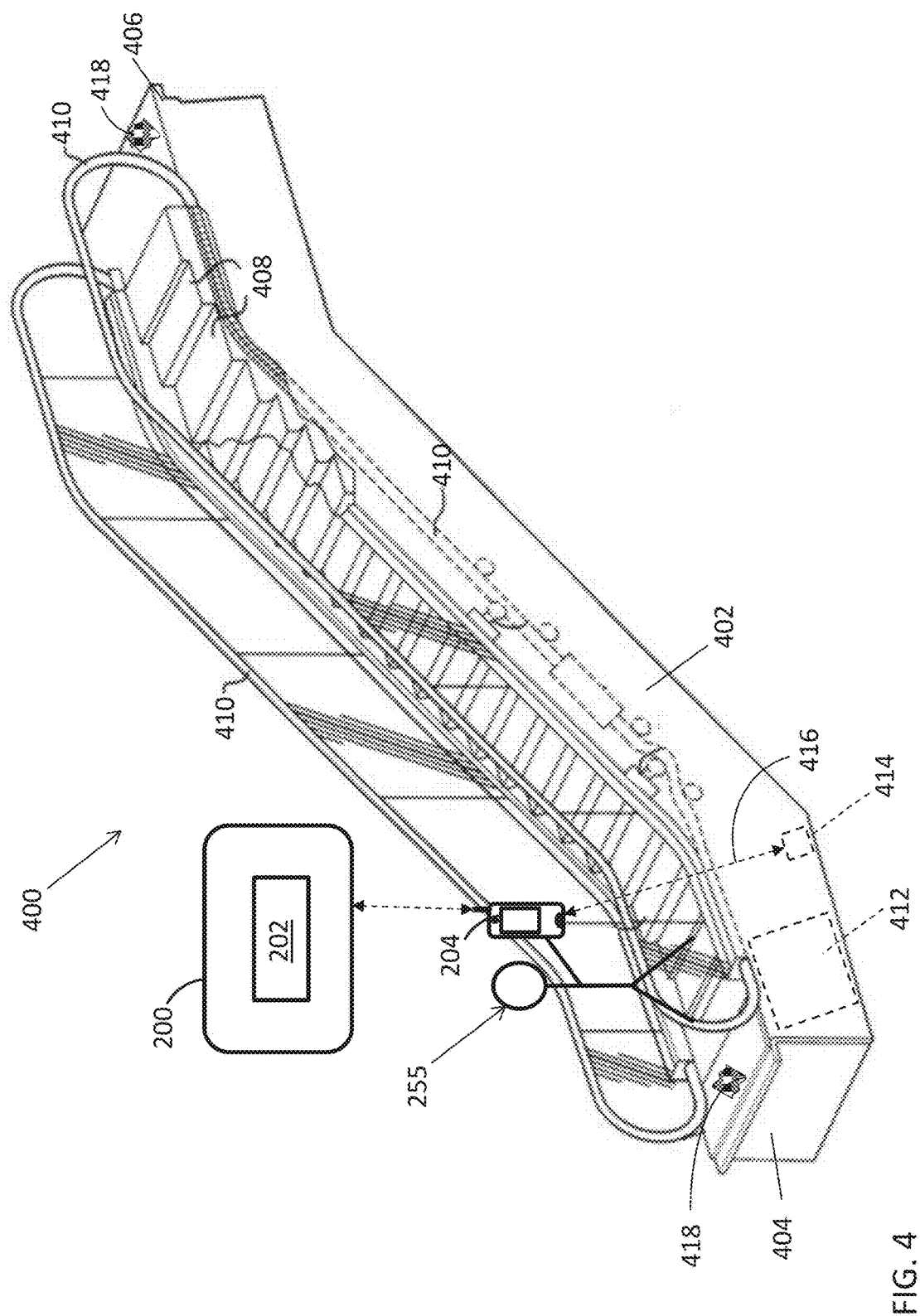
FIG. 4 illustrates a mobile terminal device installed with a passenger conveyor performance rating software application and operating in the vicinity of an escalator system according to a non-limiting embodiment.

Turning to FIG. 4, a passenger 255 is shown possessing a smartphone 204 installed with a passenger conveyor performance rating app operating in the vicinity of an escalator system 400. The escalator system 400 includes a truss 402 extending between a lower landing 404 and an upper landing 406. A plurality of sequentially connected treadplates or steps 408 are connected to a drive chain (not shown) and travel through a closed loop path within the truss 402. A pair of handrails 410 are coupled to the truss 402 and are located at opposing sides of the steps 408. The handrails 410 move along with the steps 408 to provide passenger support. A machine 412 drives the steps 408 and handrails 410. The machine 412 is typically located in a machine space within the truss 402 or under one of the landings e.g., contained within the lower landing 404.

The machine space may also include a communication system 414. The communication system 414 includes a network interface device. As described herein, the network interface device includes any communication device (e.g., a modem, wireless network adapter, etc.) that operates according to a network protocol (e.g., Wi-Fi, Ethernet, satellite, cable communications, etc.) which establishes a wired and/or or wireless communication with another electrical device. Accordingly, the communication system 414 can establish a wireless communication session 416 with the smartphone 204 to exchange various ID information including, but not limited to, a serial number of the escalator system 400, the manufacturer of the escalator system 400, and building information corresponding to the building or structure containing the escalator system 400.

The ID information described may also be obtained by processing a scan code 418 (e.g., a bar code or QR code) located on the escalator system 400. For instance, the smartphone camera can capture an image of the scan code 418 installed on the lower landing 404 and/or the upper landing 406. The captured image of the scan code 418 can then be further processed by the smartphone 204 and/or exchanged with the computing server 202, via the computing network 200, for further processing to obtain the ID information described above.

A passenger 255 can rate the operating performance of the escalator system 400 using the performance rating app installed on the smartphone 204 as described above. For instance, the performance rating app may also allow the passenger 255 to input operating fault information which the passenger 255 may have experienced while riding the escalator system 400. The fault information can include, but is not limited to, noises, vibrations, or service stoppages. The rating input, along with the ID information and fault information, can be transmitted to the computing server 202, via the computing network 200. Based on the performance rating input by the passenger 255, the computing server 202 can determine whether the escalator system 400 is faulty, and if so, can perform various dispatch operations as described herein. In addition to recording faulty operation incidents, the computing server 202 can also record satisfactory or successful rating input by the passenger 255. Accordingly, health reports of the escalator system 400 can conveniently be generated, thereby facilitating the scheduling of routine inspections by a technician.

Figure 5A:
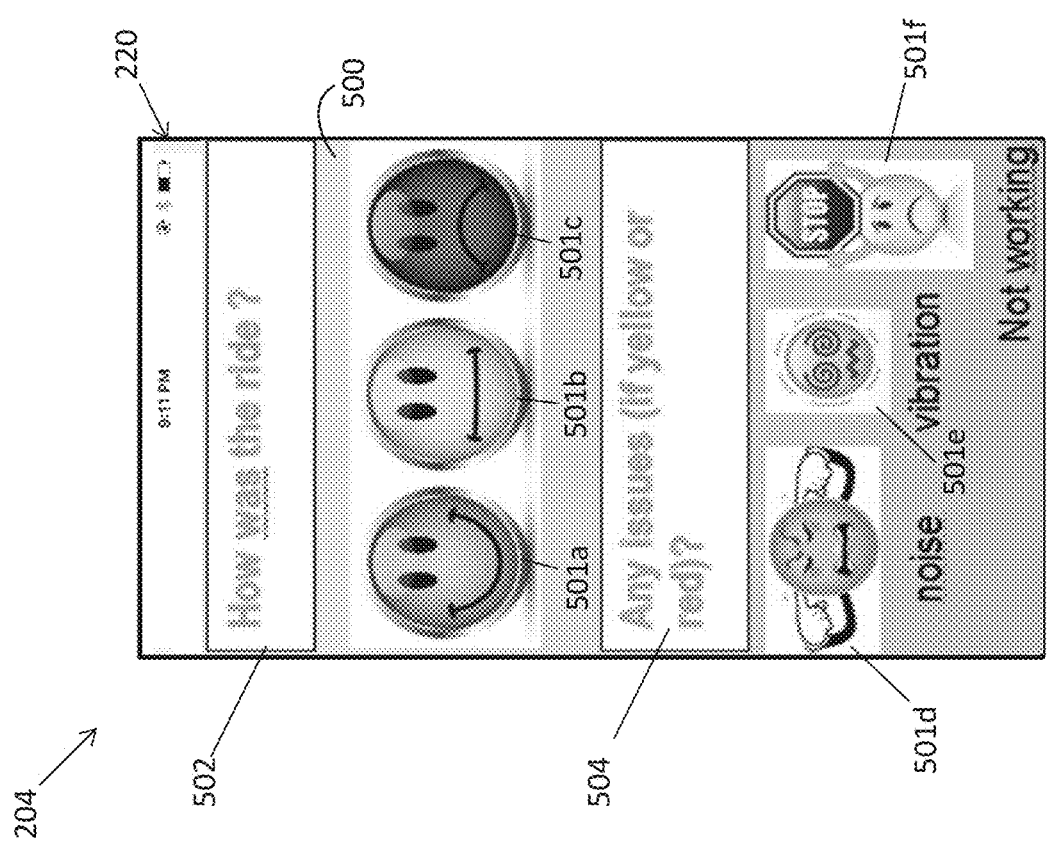
FIG. 5A illustrates a mobile terminal device displaying a performance rating graphical user interface (GUI) provided by a passenger conveyor performance rating software application according to a non-limiting embodiment.
Figure 5B:
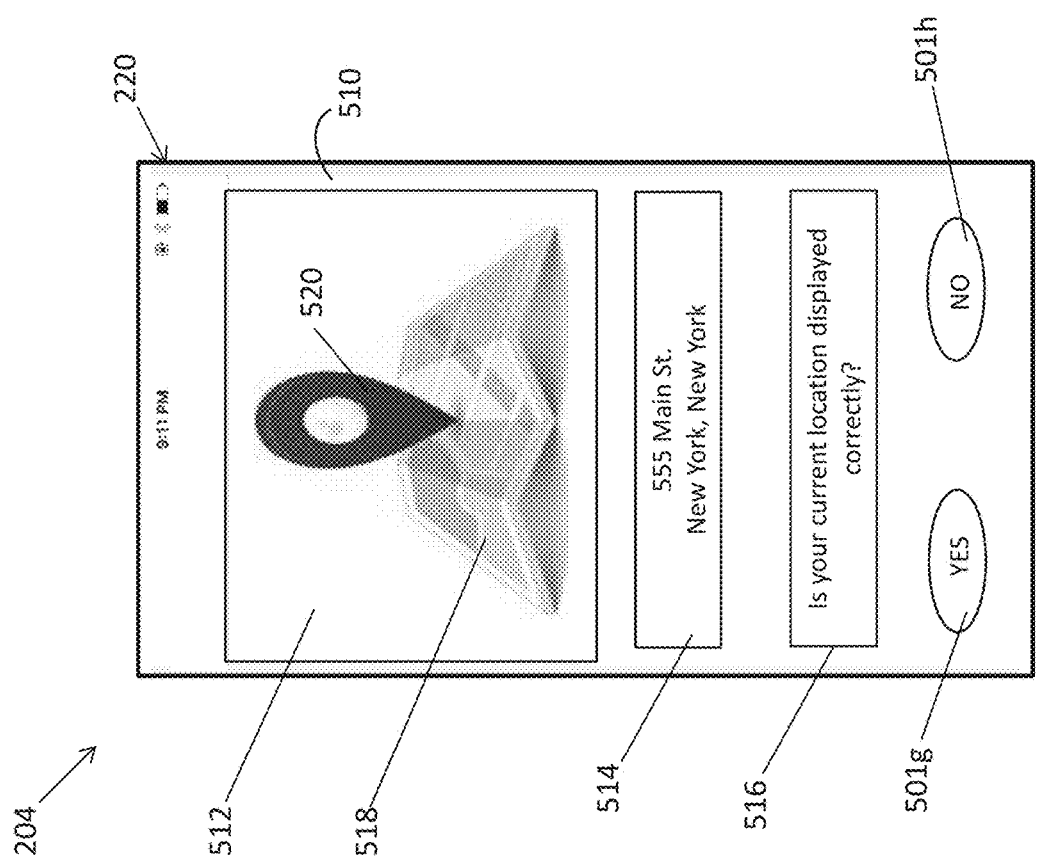
FIG. 5B illustrates a mobile terminal device displaying a location GUI provided by a passenger conveyor performance rating software application operating in a first mode according to a non-limiting embodiment.

Referring to FIGS. 5A and 5B, a mobile terminal device 204 (e.g., a smartphone 204) is illustrated operating in various modes. Each mode displays a corresponding GUI according to a non-limiting embodiment. Referring to FIG. 5A, the smartphone 204 is shown operating in a performance rating mode which presents a user (e.g., a passenger) with a performance rating GUI 500. The performance rating GUI 500 can be manually invoked by the user or can be automatically invoked in response to detecting one or more operating conditions of the passenger conveyor that is servicing the user. For example, a user riding a particular elevator car may experience abnormal noises and or vibrations. The user's smartphone 204 can detect the noises via the microphone and/or the vibrations via the accelerometer. In response to detecting the noises and/or vibrations, the smartphone 204 can automatically invoke the passenger conveyor performance rating software application, which in turn automatically displays the performance rating GUI 500.

A user can enter various inputs to the performance rating GUI 500 by touching one or more touch-screen actuators 501a, 501b, 501c, 501d, 501e and 501f displayed on the screen 220 and/or using other input actuators (not shown) installed on the smartphone 204. The performance rating GUI 500 further includes a performance query field 502 and a fault query field 504.

The performance query field 502 requests a user to rate the operating performance of the passenger conveyor using a first set of rating actuators 501a, 501b and 501c. Although three rating actuators 501a, 501b and 501c are shown, the performance rating GUI 500 can display more or less rating actuators without departing from the scope of the invention. In the non-limiting embodiment illustrated in FIG. 5A, the rating actuators 501a-501c are touch-screen icons which convey an operating performance experienced by a user of a given passenger conveyor. Accordingly, the user can manipulate (e.g., touch) one of the rating actuators 501a-501c to rate the operating performance of a given passenger conveyor. For instance, a user can touch a first rating actuator 501a to indicate an enjoyable riding experience that was free of any operating faults. Alternatively, a user can touch a second rating actuator 501c to indicate an abnormal riding experience that included an abnormal operating condition such as a noise or vibration. The user can also touch a third rating actuator 501c to indicate a poor riding experience caused by one or more operating faults of the passenger conveyor. For instance, the elevator car may experience continuous noise, vibrations and/or a service stoppage during a ride.

The fault query field 504 invites a user to manipulate one or more fault actuators 501d, 501e and 501f to indicate one or more operating faults that contributed to the abnormal or poor riding experience indicated by the corresponding rating actuator 501b or 501c. In at least one non-limiting embodiment, the fault actuators 501d-501f are touch-screen icons which convey one or more possible operating faults (e.g., noise, vibrations, operating stoppages, etc.) that may have been experienced by the user while riding a given passenger conveyor. Although three fault actuators 501d, 501e and 501f are shown, the performance rating GUI 500 can display more or less fault actuators without departing from the scope of the invention.

Turning to FIG. 5B, the smartphone 204 is shown operating in a location confirmation mode which presents a smartphone user with a location GUI 510 following input of the passenger conveyor rating using the performance rating GUI 500 (see FIG. 5A). The location GUI 510 includes a graphical map field 512, an address field 514, and a location confirmation field 516.

The graphical map field 512 displays a graphical map 518 and a user location indicator 520. The graphical map 518 is generated based on the geographical information received from the smartphone 204. The graphical map 518 illustrates nearby streets and buildings, along with the identified building that contains the passenger conveyor system operated by the smartphone user. The user location indicator 520 indicates on the graphical map 518 an estimated geographical location of the user (e.g., the building at which the user is located) that is submitting the operating performance rating of the given passenger conveyor.

The address field 514 provides additional address information regarding the user's current location. For example, the address field 514 can display the presumed street address of the building containing the passenger conveyor being rated by the user, the name of a building containing the passenger conveyor being rated by the user, a name of a department store containing the passenger conveyor being rated by the user, etc.

Figure 5C:
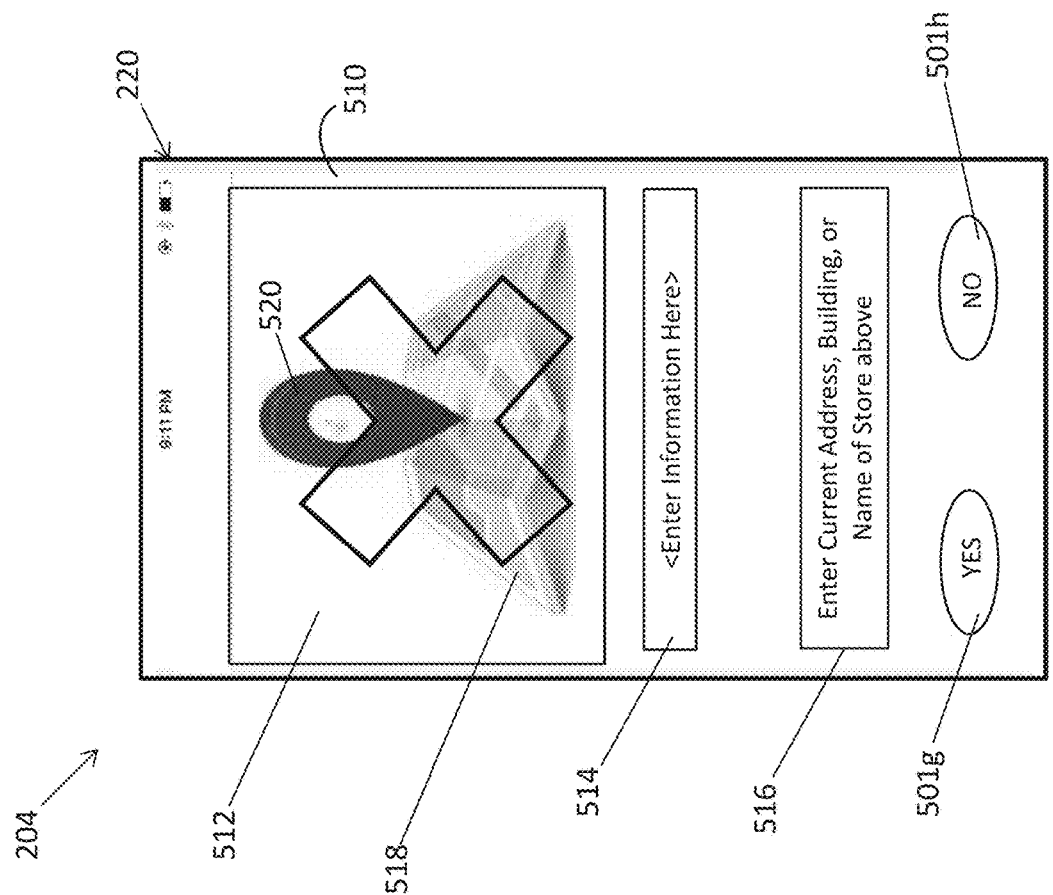
FIG. 5C illustrates the location GUI operating in a second mode according to another non-limiting embodiment.

The location confirmation field 516 prompts the user to confirm the accuracy of the address information displayed in the address field 514. When the information displayed in the address field 516 is correct, the user can input a confirmation of the address information using a first actuator 501g. When, however, the address information is incorrect, the user can select a second actuator 501h, and the address field 516 can be modified to prompt to the user to enter the correct information (e.g., street address, building name, store name, etc.) into the address field 514 (see FIG. 5C). Once entered, the user can confirm the correct address information by selected the first actuator 501g. In this manner, the specific location of a faulty passenger conveyor system can be confirmed. The specific location can then be used by the computing server to actively update a technician's maintenance schedule in real-time and/or can be used to obtain additional contact information (e.g., telephone number, email address, etc.) of the building containing the faulty passenger conveyor system.

Although the GUIs 500 and 510 are described with reference to a smartphone 204, it should be appreciated that the GUIs 500 and 510 can also be displayed via a display screen installed on an individual passenger conveyor without departing from the scope of the invention. For example, the internal cabin of an elevator car may include a display screen that displays the GUIs 500 and 510 described herein. The display screen allows a passenger of a particular elevator car to rate the performance of the elevator car and/or overall elevator system from within cabin. Accordingly, identification of a particular elevator car or system is made more convenient.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A passenger conveyor performance rating system for a passenger conveyor system, comprising:
   a user device configured to:
   obtain geographical information of the passenger conveyor system; and
   display a graphical user interface that receives a first input indicating an operating performance of an individual passenger conveyor included in the passenger conveyor system, and that receives a second input indicating at least one operation fault of the individual passenger conveyor;
   a computing server in signal communication with the user device, the computing server configured to:
   receive first data indicating the operating performance, second data indicating the at least one operation fault, and third data indicating the geographical information;
   determine a faulty passenger conveyor system based on the first data and the second data; and
   determine the geographical location of the faulty passenger conveyor system based on the geographical information received from the user device,
   wherein the computing server generates a graphical map displaying the geographical location of the faulty passenger conveyor system based on the geographical information received from the user device that receives the second input indicating the at least one operation fault of the individual passenger conveyor.

2. The passenger conveyor performance rating system of claim 1, wherein:

the user device obtains identification (ID) information of the individual passenger conveyor among a plurality of passenger conveyors included in the passenger conveyor system; and the computing server identifies the individual passenger conveyor containing the fault among a plurality of passenger conveyors included in the passenger conveyor system based on the ID information.

3. The passenger conveyor performance rating system of claim 1, wherein the computing server determines contact information corresponding to the passenger conveyor system based on the geographical information.

4. The passenger conveyor performance rating system of claim 3, wherein the computing server automatically sends a maintenance inquiry based on the contact information, the maintenance inquiry proposing maintenance service of the identified passenger conveyor.

5. The passenger conveyor performance rating system of claim 1, wherein the user device automatically displays the graphical user interface in response to detecting the at least one operation fault of the individual passenger conveyor.

6. The passenger conveyor performance rating system of claim 1, wherein the user device is a first mobile terminal device, and wherein the computing server is in signal communication with a second mobile terminal device different from the first mobile terminal device, and the computing server transmits an updated maintenance schedule and the graphical map to the second mobile terminal device.

7. The passenger conveyor performance rating system of claim 6, wherein the computing server updates the maintenance schedule based on the first and second data.

8. A method of diagnosing an operating performance of a passenger conveyor system, the method comprising:
obtaining, via a user device, geographical information of the passenger conveyor system;
displaying, via the user device, a graphical user interface configured to receive a first input indicating an operating performance of an individual passenger conveyor included in the passenger conveyor system, and a second input indicating at least one operation fault of the individual passenger conveyor;
receiving, at a computing server, first data, second data, and third data transmitted by the user device, the first data indicating the operating performance, the second data indicating the at least one operation fault, and the third data indicating the geographical information;
determining a faulty passenger conveyor system based on the first data and the second data; and
determining the geographical location of the faulty passenger conveyor system based on the geographical information received from the user device,
wherein the computing server generates a graphical map displaying the geographical location of the faulty passenger conveyor system based on the geographical information received from the user device that receives the second input indicating the at least one operation fault of the individual passenger conveyor.

9. The method of claim 8, further comprising:
obtaining, via the user device, identification (ID) information of the individual passenger conveyor among a plurality of passenger conveyors included in the passenger conveyor system; and
identifying, via the computing server, the individual passenger conveyor containing the fault among a plurality of passenger conveyors included in the passenger conveyor system based on the ID information received from the user device.

10. The method of claim 8, wherein the computing server determines contact information corresponding to the passenger conveyor system based on the geographical information.

11. The method of claim 10, wherein the computing server automatically sends a maintenance inquiry based on the contact information, the maintenance inquiry proposing maintenance service of the identified passenger conveyor.

12. The method of claim 8, wherein the user device automatically displays the graphical user interface in response to detecting the at least one operation fault of the individual passenger conveyor.

13. The method of claim 12, wherein the user device is a first mobile terminal device, and wherein the computing server is in signal communication with a second mobile terminal device different from the first mobile terminal device, the computing server transmits an updated maintenance schedule and the graphical map to the second mobile terminal device, and the computing server updates the maintenance schedule based on the first and second data.

* * * * *